United States Patent [19]
Glenn

[11] 3,976,830
[45] Aug. 24, 1976

[54] APPARATUS AND METHOD FOR EMBOSSING INFORMATION ON A DISC

[75] Inventor: William E. Glenn, Stamford, Conn.

[73] Assignee: CBS Inc., New York, N.Y.

[22] Filed: Oct. 24, 1974

[21] Appl. No.: 517,529

[52] U.S. Cl. .................... 178/6.6 B; 179/100.4 C; 179/100.41 P; 310/8.2; 310/8.3
[51] Int. Cl.² .................. H04R 17/06; H01L 23/14; H01L 41/08
[58] Field of Search............ 179/100.41 P, 100.4 C; 178/6.6 A, 6.6 B; 310/8.2, 8.3, 9.5, 9.6

[56] References Cited
UNITED STATES PATENTS

| | | | |
|---|---|---|---|
| 3,824,352 | 7/1974 | Adler et al. | 179/100.41 P |
| 3,829,605 | 8/1974 | Dickopp | 179/100.41 P |
| 3,865,997 | 2/1975 | Halter | 179/100.4 C |

Primary Examiner—Bernard Konick
Assistant Examiner—Jay P. Lucas
Attorney, Agent, or Firm—Spencer E. Olson

[57] ABSTRACT

The disclosure pertains to an apparatus for receiving electronic signals and embossing modulated grooves on a carrier medium as a function of the received signals, the apparatus including a support for supporting an embossing assembly and a carrier medium in spaced relationship therewith, as well as apparatus for causing relative motion between the carrier medium and the embossing assembly. In accordance with the invention there is provided a wafer of piezoelectric material affixed to the mount, the wafer having electrodes for application of the electronic signals. Further provided is a horn-shaped stylus member having a relatively blunt end affixed to one side of the wafer and tapering to a relatively pointy stylus end, the stylus end being positionable in contact with the medium. The horn-shaped member serves to match the mechanical impedence as between the wafer and the carrier.

6 Claims, 3 Drawing Figures

APPARATUS AND METHOD FOR EMBOSSING INFORMATION ON A DISC

BACKGROUND OF THE INVENTION

This invention relates to an apparatus for embossing modulated grooves on a carrier medium as a function of received electronic signals and, more particularly, to such an apparatus wherein the electronic signals may represent video information. The subject matter of this application is related to subject matter disclosed in the copending U.S. application Ser. No. 517,530 of James White entitled "Apparatus For Embossing Information On a Disc" now U.S. Pat. No. 3,946,149.

There have been recently developed a number of systems for storing video and audio information on a carrier medium which, ideally, could be purchased by consumers at a reasonable cost and reproduced in conjunction with their conventional home television receivers. Typically, the consumer would purchase a "player" which would recover electronic video signals from a recording medium and these signals would be applied to the antenna terminals of a television set for display. There has been widespread disagreement as to what type of recording medium provides the maximum overall advantage of cost, performance, and reliability, with systems using magnetic tape, film and discs similar to long playing records, all receiving support from different technical factions. During the last five years it has been demonstrated that video discs, which are in some respect similar to conventional sound recording discs, are capable of producing reasonable quality picture information. It is generally thought that these discs, which can be pressed from vinyl in a manner similar to conventional audio disc pressing, offer a great advantage of economy to the consumer, but disc systems present a number of new technical problems when it is attempted to record the relatively high frequencies required for video information thereon. For example, it is necessary that the video disc store about one hundred times the capacity of information of an audio record, and that the video disc reproducer handle a flow of information that is of the order of one hundred times faster than a photograph pickup. Accordingly, the undulations in the disc grooves are much smaller than those of a conventional audio record and the necessarily small dimensions lead to problems in making the discs and in playback. Various types of playback systems have been proposed, for example playback employing an electrostatic capacitive-discharge technique or playback employing a pressure-type transducer which "slides" over the record grooves. In most systems, however, there is a common problem in producing the discs and, more specifically, in fabricating master discs from which relatively high quality duplicates can be pressed.

There are two types of "master" fabrication techniques that are of interest herein; i.e., electron beam processes and mechanical cutting processes. In the electron beam process a carrier is coated with an electron-sensitive material and selectively exposed using a modulated electron beam. This type of recording has been performed successfully, although electron beam recording is a relatively expensive technique which requires a strigently controlled environment. Also, there has been difficulty in achieving electron beam recording in "real time" since at video frequencies this would require the beam to expose the electron-sensitive material at a high rate of relative motion which limits the amount of exposure time for each elemental area of electron-sensitive material and aggravates tracking problems. Therefore, it is the present practice to record using an electron beam at about one twentieth of real time, which is typically achieved by reducing the frequency of input signals by a factor of 20 and slowing the relative motion between the beam and the carrier by the same factor of 20.

The mechanical cutting process has also apparently been performed with some success. A company which is introducing a commercial video disc system claims to make masters using a mechanical cutting process similar to that used for conventional records. However, they acknowledge that the mechanical cutting process is not performed in real time, which is not surprising since conventional cutters cannot be satisfactorily operated at the megahertz frequencies necessary for real time recording.

It is accordingly one object of the present invention to provide an improved technique of mechanically embossing relatively high frequency information on a record medium, the embossing being capable of being done in real time.

SUMMARY OF THE INVENTION

The present invention employs a piezoelectric element as a "driver" for an embossing assembly. In the past, piezoelectric elements have been widely used in conjunction with pickup assemblies but, to applicant's knowledge, these elements have not been considered as suitable drive elements in cutters for various reasons. At audio frequencies, a conventional coil-driven cutter performs adequately and readily yields whatever displacement excursions are required to fabricate a master recording. A piezoelectric drive element, on the other hand, does not produce a relatively large displacement excursion, so this type of drive element is generally not envisioned as being advantageous for mechanical embossing. This need for a relatively large displacement would seemingly be even more defeating at very high frequencies where, if the element was driven "hard" to obtain the maximum excursion, the resultant velocity (which is a function of frequency times displacement) would be so great as to likely destroy the piezoelectric element in a very short time. The present invention is believed to solve this problem and, in doing so, provide a system which can successively emboss video frequencies in real time.

The present invention pertains to an apparatus for receiving electronic signals and embossing modulated grooves on a carrier medium as a function of the received signals, the apparatus including means for supporting an embossing assembly and a carrier medium in spaced relationship therewith as well as means for causing relative motion between the carrier medium and the embossing assembly. In accordance with the invention there is provided a wafer of piezoelectric material affixed to the supporting means, the wafer having electrodes for application of the electronic signals. Further provided is a horn-shaped stylus member having a relatively blunt end affixed to one side of the wafer and tapering to a relatively pointy stylus end, the stylus end being positionable in contact with the medium. The horn-shaped member serves to match the mechanical impedance between the wafer and the carrier. Stated another way, the horn-shaped member acts as a mechanical transformer which serves to increase the displacement excursions of the stylus end.

In the preferred embodiment of the invention a horn-shaped "dummy" load is affixed to the other side of the piezoelectric wafer to improve mechanical performance.

Further features and advantages of the invention will become more readily apparent from the following detailed description when taken in conjunction with the accompanying drawings.

DESCRIPTION OF THE PREFERRED EMBODIMENT

Figure 1:
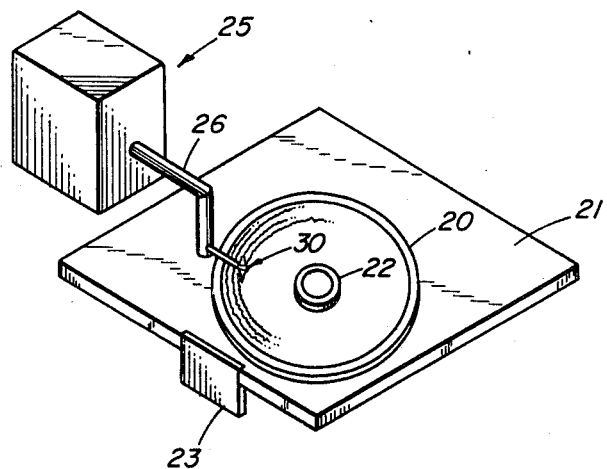
FIG. 1 is a simplified diagram of an embossing apparatus which includes the present invention.

Referring to FIG. 1, there is shown a simplified diagram of an embossing apparatus which includes the present invention. A carrier medium, such as a thin plastic disc 20, is mounted over a suitable surface 21 which has a chuck 22 that grasps the disc center and is adapted for rotation by a motor 23. The disc 20 may be formed of any suitable material which is deformable, such as lexan, mylar, vinyl or lacquer. The metals aluminum and silver are also found to offer reasonable results when deposited as a film on a plastic base. The disc is preferably thin enough to be considered "floppy", and when it is spun at a relatively high rotation rate the layer of air between the disc bottom and surface 21 acts as an "air bearing". During such rotation the forces on the disc tend to cause a desirable degree of flatness.

A mounting means 25, which includes a support arm 26, supports an embossing assembly 30 in spaced relationship with the surface 21. The support arm 26 is slidable radially, in conventional fashion, so as to form the familiar spiral groove on the disc 20. It will be understood that the radial motion is synchronized with the rotation of the turntable as a function of the desired groove geometries. This technique is known in the art and will not be discussed in detail, but it can be noted at this point that for "real time" recording the rotation of the turntable typically coincides with the rotation rate at which duplicated recordings are expected to be rotated during playback. The embossing assembly 30 includes a stylus, to be described, which is driven as a function of the electronic signals which are to be embossed on the disc 20. The signals are coupled to the assembly 30 via conductors which are not visable in the FIG. 1 diagram.

From an overview system standpoint, operation of the apparatus of FIG. 1 is similar to a conventional record cutter. Specifically, the blank disc 20 is rotated in synchronism with the radial motion of embossing assembly 30. The application of electrical signals to the embossing assembly causes motion of its stylus, in a manner to be described, which results in a spiral groove in recording disc 20 that is modulated in accordance with the applied electrical signals. After embossing, the disc can be plated with an appropriate metal to produce a "metal master" which, in turn, can be used to ultimately fabricate reproductions, for example using conventional vinyl pressing techniques.

Figure 2:
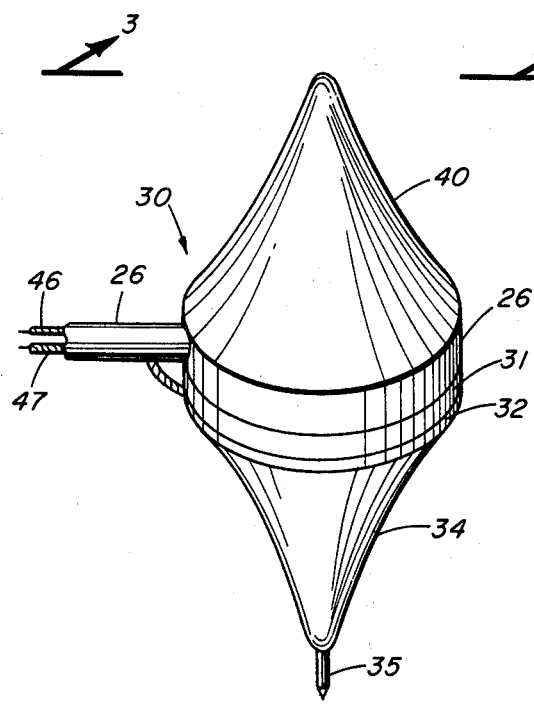
FIG. 2 is an enlarged perspective view of an embodiment of an embossing assembly in accordance with the invention.
Figure 3:
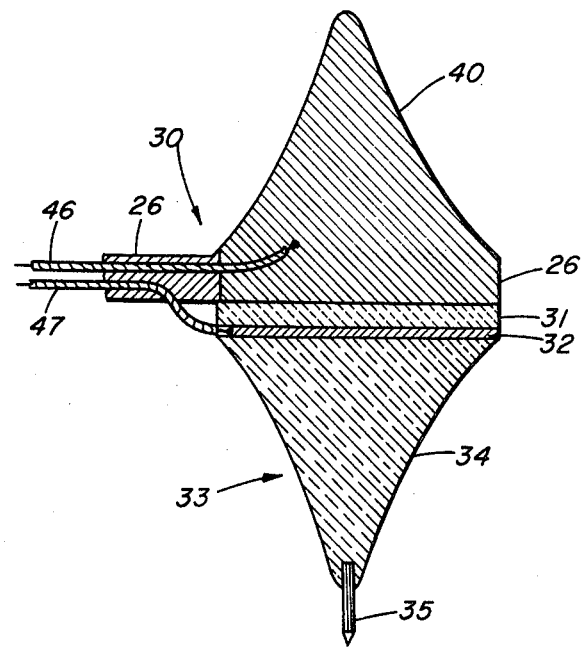
FIG. 3 is a sectional view as taken through arrows 3—3 of FIG. 2.

Referring to FIGS. 2 and 3 there is shown an enlarged perspective view of the embossing assembly 30 in accordance with the present embodiment. A wafer of piezoelectric material 31 is provided, preferably in the shape of a disc. As used herein, the term "piezoelectric material" is intended to include any material which exhibits a piezoelectric effect; i.e., a mechanical strain resulting from the application of electricity.

A disc of piezoelectric ceramic material that is purchased commercially, such as from Clevite Corporation, typically has thin metal electrodes, for example silver electrodes, deposited on its opposite faces. A metal disc 32, which may be aluminum, is attached to the underside of wafer 31, an exceedingly thin layer of contact cement being suitable for this purpose. The disc 32 serves as an electrode, so electrical contact with the underside of wafer 31 is needed. This contact is achieved by the asperities on the respective surfaces when a very thin layer of cement is employed.

A stylus member 33 is cemented to the underside of the metal disc 32, a thin layer of contact cement again sufficing for this purpose. The stylus member 33 may be sometimes referred to herein as being "affixed" to the wafer 31, although its attachment to the wafer is via the metal disc 32. This is consistent with the intended meaning of "affixed" which, as used herein, is defined as a fastening that may be direct or indirect through one or more media. In the present embodiment the stylus member comprises a horn-shaped tapered section 34, preferably formed of glass, and a stylus tip 35 embedded in the glass and preferably formed of a very hard material, such as sapphire or diamond. The member 33 may, however, be made of a single material. The horn 34 can be molded from glass with the tip 35 in position, so that the tip is permanently embedded in the glass.

A member 40, referred to as a "dummy horn", which can be molded from a metal such as aluminum, is provided in the shape of a horn and cemented to the top surface of wafer 31. In the present embodiment the support arm 26 is affixed to wafer 31 via the dummy horn 40; i.e., support arm 26 is fastened to dummy horn 40 which, in turn, holds the wafer 31 and the rest of the embossing assembly 30. The dummy horn 40 serves, inter alia, as an electrode, a voltage being applied across the wafer 31 by virtue of signals applied over insulated conductors 46 and 47. If desired, the arm 26 could act as one of the conductors.

For operation (referring to all Figures) the mounting means 25 is positioned such that, without a signal applied, the stylus tip 35 will make a groove of desired depth in the disc 20. A typical groove depth may be less than one micron. During operation, electrical signals are applied to the electrodes 32 and 40 (via conductors 46 and 47), and the wafer 31 contracts and expands as a function of the applied signal. This causes a compressional wave to be established in the horn 34, the wave propagating vertically downward toward the stylus tip 35. As a result, the tip 35 vibrates and causes modulations in the groove, the groove being formed as the disc moves with respect to tip 35 (as is depicted in the sketch of FIGS. 2 and 3). The stylus tip may be of any suitable shape, but a tip having a relatively sharp trailing edge is preferred to obtain the necessary resolution.

The excited piezoelectric wafer's excursions can be categorized, for purposes of the intended application, as being of relatively small vertical displacement with a relatively great force. In other words, the total force over the piezoelectric wafer area is greater than is needed to deform an elemental area of the recording disc material with the stylus tip, but the vertical displacement is less than the desired level of modulation in the groove. The horn 34 serves to transform a compressional wave (acoustic in nature) having a relatively high force and a relatively low velocity into a compressional wave of reduced force and increased velocity (i.e., rate of displacement). The result is a motion of the stylus tip that is compatible with the recording objective. In this manner, the high frequency deformations of a piezoelectric wafer can be advantageously utilized without the need for driving the wafer beyond its capabilities. This allows heretofore unattainable mechanical recording at megahertz frequencies.

The described phenomenon can be alternatively visualized in terms of mechanical impedances. The piezoelectric wafer 31, which supplies the driving force, can be considered as a relatively hard mechanical impedance whereas the stylus tip working on a small area of recording disc 20 presents a relatively low mechanical impedance to be driven. Accordingly, the horn 34 serves the function of matching the dissimilar impedances.

The present disclosed embodiment is found to overcome additional problems which arise when attempting to record megahertz frequencies in real time. One objective is to obtain a reasonably stable frequency response over a frequency range of the order of five megahertz or more. Unlike some mechanical driving systems wherein a particular mechanical resonance can be used to advantage, the present system is necessarily designed to prevent severe perturbations in the frequency response curve while still delivering power with reasonable efficiency over the frequency range of interest. The dummy horn 40, which is preferably similar in shape to the horn 34, is found to reduce undesirable acoustic resonances, a result which is believed due, at least in part, to its acting as a proper mechanical load on the back side of the piezoelectric driver 31. It can be noted that the tapering of the dummy horn serves to reduce the effect of undesired acoustic resonances that would normally be aggravated by an abrupt termination plane. The dummy horn also serves as a heat sink and an electrode in the present embodiment.

A tapered horn characteristically exhibits a lower cutoff frequency for a compressional wave propagating therein, and it is desirable in the present system to have a cutoff frequency that is below about one megahertz. A curved taper, such as an exponential or hyperbolic surface is found to be an advantageous shape for the horn 34 in providing a suitable frequency response with a well defined relatively low cutoff frequency. It is impractical to expect that resonance-free response can be obtained over the wide intended operating frequency range. Rather, it is found that a large number of closely spaced small resonances over the frequency range of interest can provide acceptable operation, and the curved tapered horn 34 facilitates obtainment of this characteristic.

The invention has been described with reference to a particular embodiment, but it will be appreciated that variations and additions within the spirit and scope of the invention will occur to those skilled in the art. For example, a "cap" of acoustic damping material may be provided over the dummy horn to obtain a desired degree of controlled damping.

I claim:

1. In an apparatus for receiving broadband electronic signals at frequencies in the megahertz region of the spectrum and embossing modulated grooves on a carrier medium as a function of the received signals, said apparatus including means for supporting an embossing assembly and said carrier medium in spaced relationship and means for causing relative motion as between said carrier medium and said embossing assembly; an embossing assembly comprising:

a wafer of piezoelectric material affixed to said supporting means;

means for applying said electronic signals across said wafer;

a tapered stylus member having a relatively blunt end coupled to one side of said wafer and tapering exponentially to a relatively pointy stylus end, said stylus end being positionable in contact with said medium, said tapered member serving to match the mechanical impedance as between said wafer and said carrier.

2. A method of embossing modulated grooves on a carrier medium with a stylus tip as a function of received electronic signals at frequencies in the megahertz region of the spectrum, comprising the steps of:

mounting a piezoelectric wafer in spaced relation with said carrier medium;

driving the piezoelectric wafer with said electronic signals to establish a compressional wave;

transforming the compressional wave to a state of higher velocity at lower force by coupling said wafer to an exponentially tapered horn; and applying the transformed wave to said stylus tip.

3. In an apparatus for receiving electronic video signals at frequencies in the megahertz region of the spectrum and mechanically embossing modulated grooves on a carrier medium as a function of the received signals, said apparatus including means for supporting an embossing assembly and said carrier medium in spaced relationship and means for causing relative motion as between said carrier medium and said embossing assembly comprising:

a wafer of piezoelectric material coupled to said supporting means;

first and second electrodes formed on the opposing sides of said wafer;

means for applying said electronic video signals to said electrodes; and a tapered stylus member having a relatively blunt end affixed to one of said electrodes and tapering exponentially to a relatively pointy stylus end, said stylus end being positionable in contact with said medium, said tapered member serving to match the mechanical impedance as between said wafer and said carrier.

4. In an apparatus for receiving broadband electronic signals at frequencies in the megahertz region of the spectrum and embossing modulated grooves on a carrier medium as a function of the received signals, said apparatus including means for supporting an embossing assembly and said carrier medium in spaced relationship and means for causing relative motion as between said carrier medium and said embossing assembly; an embossing assembly comprising:

a wafer of piezoelectric material affixed to said supporting means;

means for applying said electronic signals across said wafer;

a tapered stylus member having a relatively blunt end coupled to one side of said wafer and tapering hyperbolically to a relatively pointy stylus end, said stylus end being positionable in contact with said medium, said tapered member serving to match the mechanical impedance as between said wafer and said carrier.

5. A method of embossing modulated grooves on a carrier medium with a stylus tip as a function of received electronic signals at frequencies in the megahertz region of the spectrum, comprising the steps of:

mounting a piezoelectric wafer in spaced relation with said carrier medium;

driving the piezoelectric wafer with said electronic signals to establish a compressional wave;

transforming the compressional wave to a state of higher velocity at lower force by coupling said wafer to a hyperbolically tapered horn; and applying the transformed wave to said stylus tip.

6. In an apparatus for receiving electronic video signals at frequencies in the megahertz region of the spectrum and mechanically embossing modulated grooves on a carrier medium as a function of the received signals, said apparatus including means for supporting an embossing assembl and said carrier medium in spaced relationship and means for causing relative motion as between said carrier medium and said embossing assembly comprising:

a wafer of piezoelectric material coupled to said supporting means;

first and second electrodes formed on the opposing sides of said wafer;

means for applying said electronic video signals to said electrodes; and a tapered stylus member having a relatively blunt end affixed to one of said electrodes and tapering hyperbolically to a relatively pointy stylus end, said stylus end being positionable in contact with said medium, said tapered member serving to match the mechanical impedance as between said wafer and said carrier.

* * * * *